(12) United States Patent
Gilovich

(10) Patent No.: US 7,031,115 B1
(45) Date of Patent: Apr. 18, 2006

(54) DATA STORAGE DEVICE HAVING SINGLE ACTUATOR ASSEMBLY OR MULTIPLE ACTUATOR ASSEMBLIES

(76) Inventor: Paul A. Gilovich, 6075 Stonecreek Dr., Reno, NV (US) 89509

( * ) Notice: Subject to any disclaimer, the term of this patent is extended or adjusted under 35 U.S.C. 154(b) by 258 days.

(21) Appl. No.: 10/161,307

(22) Filed: Jun. 3, 2002

Related U.S. Application Data

(60) Provisional application No. 60/297,636, filed on Jun. 12, 2001.

(51) Int. Cl.
*G11B 21/08* (2006.01)

(52) U.S. Cl. .................................. 360/264.4

(58) Field of Classification Search ............ 360/264.4, 360/264.5, 97.01, 97.02, 264.1; 361/685
See application file for complete search history.

(56) References Cited

U.S. PATENT DOCUMENTS

| | | | |
|---|---|---|---|
| 5,291,357 A * | 3/1994 | Uda | 360/99.08 |
| 5,761,007 A * | 6/1998 | Price et al. | 360/264.4 |
| 6,052,255 A * | 4/2000 | Kawabe et al. | 360/97.02 |
| 6,560,075 B1 * | 5/2003 | Price et al. | 360/264.3 |
| 6,690,549 B1 * | 2/2004 | Aikawa et al. | 360/264.4 |
| 2002/0030922 A1 * | 3/2002 | Yoshida et al. | 360/97.01 |
| 2003/0174464 A1 * | 9/2003 | Funawatari et al. | 361/685 |

* cited by examiner

*Primary Examiner*—William Korzuch
*Assistant Examiner*—Mark Blouin
(74) *Attorney, Agent, or Firm*—Emery L. Tracy

(57) ABSTRACT

A data storage device is provided having at least one disk rotated by a spindle motor and at least one actuator arm assembly rotatable in response to a voice coil motor about a pivot point for moving a magnetic head on an actuator arm for writing data onto the tracks of the disk and reading the data recorded on the tracks of the disk. The data storage device comprises a first plate, the spindle motor being secured to the first plate and a second plate secured to the first plate, the actuator arm assembly being secured to the second plate. A method for mounting at least one actuator assembly within a data storage device is also provided.

18 Claims, 11 Drawing Sheets

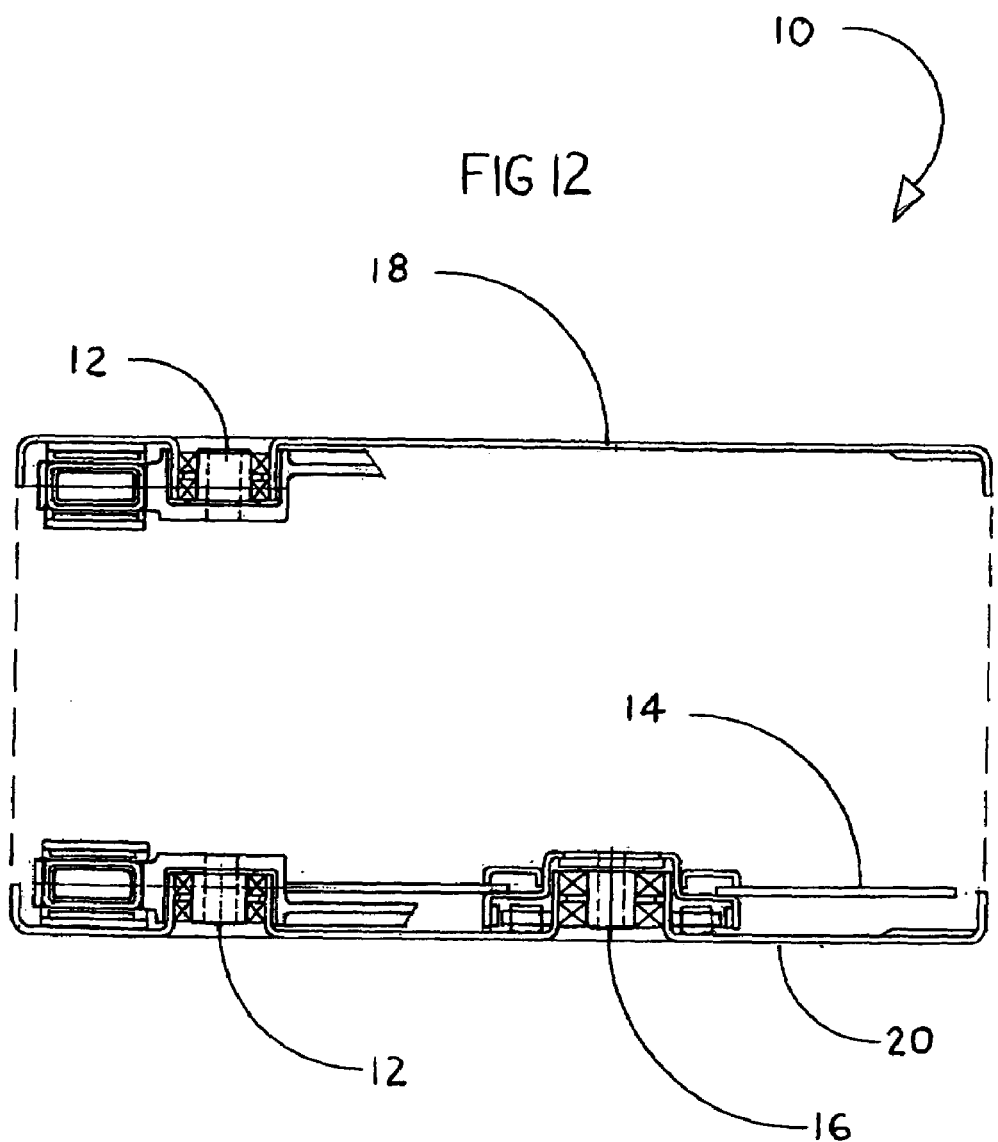

DATA STORAGE DEVICE HAVING SINGLE ACTUATOR ASSEMBLY OR MULTIPLE ACTUATOR ASSEMBLIES

The present application is a continuation of provisional patent application Ser. No. 60/297,636, filed on Jun. 12, 2001, now abandoned entitled "Data Storage Device Having A Single Actuator Assembly or Multiple Actuator Assemblies".

BACKGROUND OF THE INVENTION

1. Field of the Invention

This invention relates generally to data storage devices and, more particularly, the invention relates to data storage devices having single actuator assemblies or multiple actuator assemblies.

2. Description of the Prior Art

Generally, a disk drive is used as an auxiliary memory device in a computer. The disk drive includes at least one disk which is rotated at a high speed by a spindle motor, and a single actuator arm assembly which rotates in response to a voice coil motor about a pivot point for moving a magnetic head on an actuator arm that writes data onto the tracks of the disk and reads the data recorded on the tracks of the disk. The magnetic head is located on a leading end of a head gimbals, which typically moves along both sides of the disk, wherein the magnetic head is influenced by an airflow generated on a surface of the disk as the disk rotates at a high speed to maintain a minute gap between the magnetic head on the actuator arm and the disk.

The elements of the disk drive are typically positioned within a base plate housing covered by a top plate. Both the actuator arm assembly and the spindle motor are attached to the base plate housing. Furthermore, in an attempt to seal the interior of the disk drive from foreign material and other debris, a gasket is positioned between the base plate and the housing.

SUMMARY

The present invention is a data storage device having at least one disk rotated by a spindle motor and at least one actuator arm assembly rotatable in response to a voice coil motor about a pivot point for moving a magnetic head on an actuator arm for writing data onto the tracks of the disk and reading the data recorded on the tracks of the disk. The data storage device comprises a first plate, the spindle motor being secured to the first plate and a second plate secured to the first plate, the actuator arm assembly being secured to the second plate.

The present invention further includes a method for mounting at least one actuator arm assembly within a data storage device. The method comprises providing a first plate, securing the spindle assembly to the first plate, providing a second plate, securing an actuator assembly to the second plate, and mounting the first plate to the second plate.

BRIEF DESCRIPTION OF THE DRAWINGS

FIG. 11 is another sectional side view illustrating another embodiment of the data storage device having plastic base plate housing with a thin steel liner secured to the base plate housing;

FIG. 12 is another sectional side view illustrating another embodiment of the data storage device having a plastic top plate with a thin steel liner secured to the top plate.

DETAILED DESCRIPTION OF THE PREFERRED EMBODIMENTS

Figure 1:
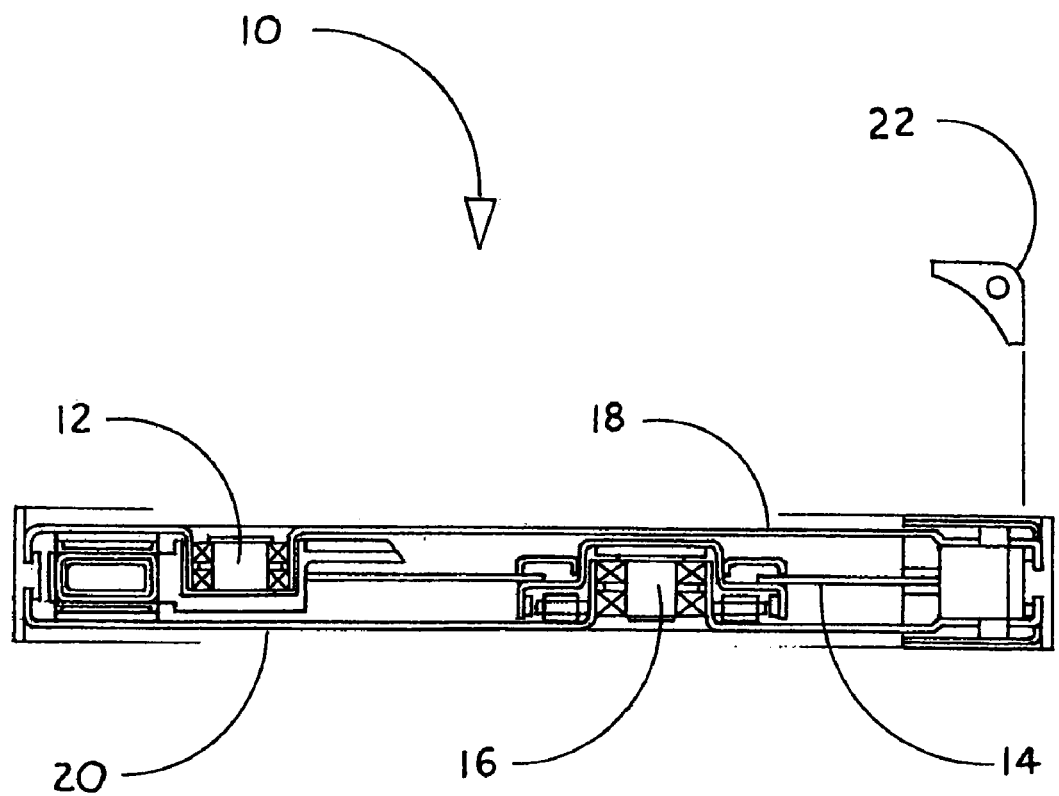
FIG. 1 is a sectional side view illustrating the data storage device, constructed in accordance with the present invention, having a spindle assembly mounted to a first plate and a single actuator assembly mounted to a second plate.

As illustrated in FIGS. 1–13, the Applicant of the present application has invented a new and improved data storage device, indicated generally at 10, having a single actuator assembly 12 or multiple actuator assemblies 12. The data storage device 10 can be any type of rotatable storage device, especially, but not limited to, magnetic memory devices such as a hard disk drive apparatus. It should be noted that while the present invention has been described herein and will be described heretofore as a hard disk drive apparatus and the like having a disk 14 rotated by a spindle assembly 16, it is within the scope of the present invention to utilize any data storage device. The person skilled in the art will understand that the data storage device 10 of the present invention is not limited to a hard disk drive apparatus and the like.

Figure 2:
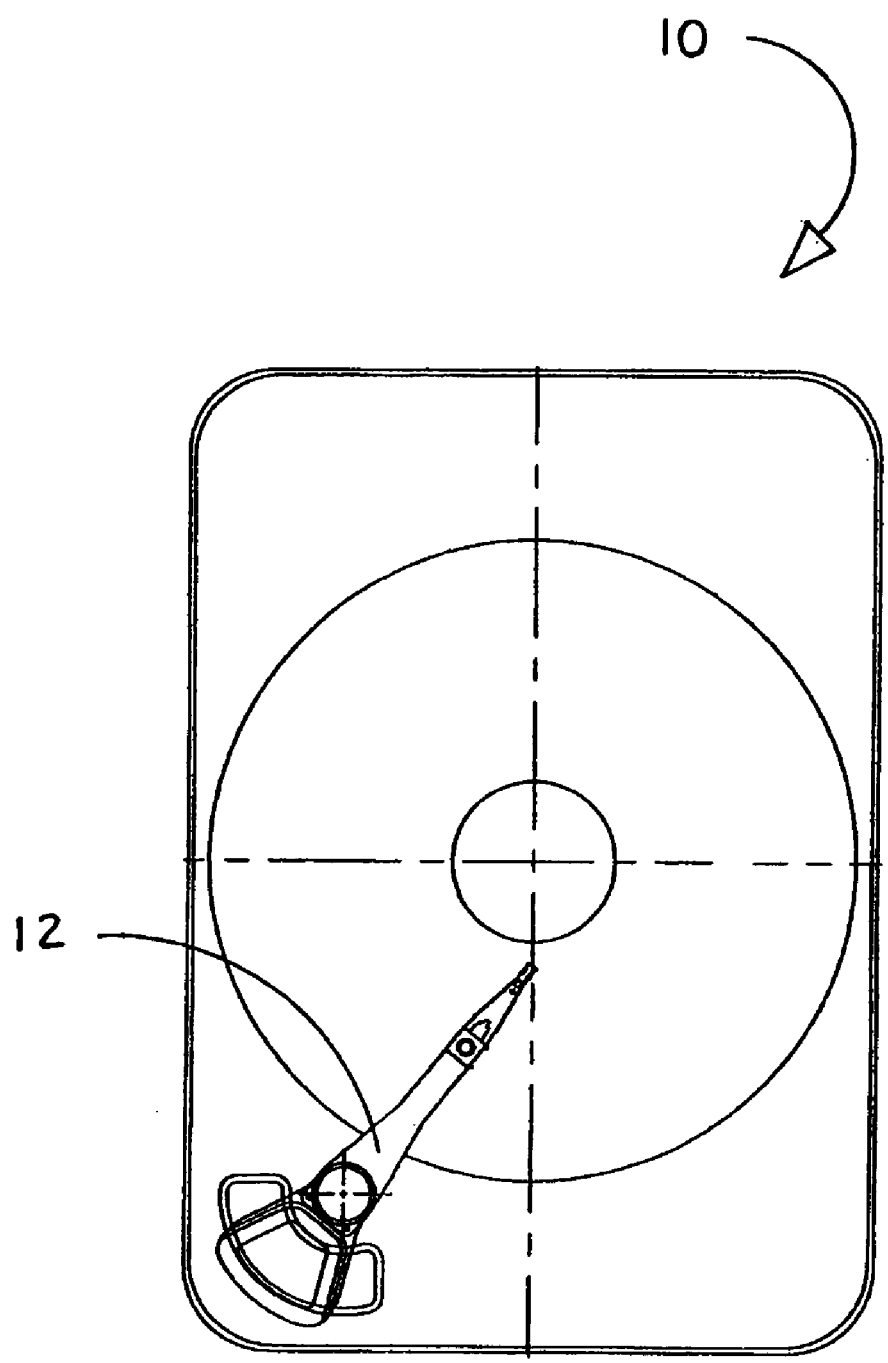
FIG. 2 is a top plan view illustrating the data storage device of FIG. 1, constructed in accordance with the present invention.
Figures 3, 4:
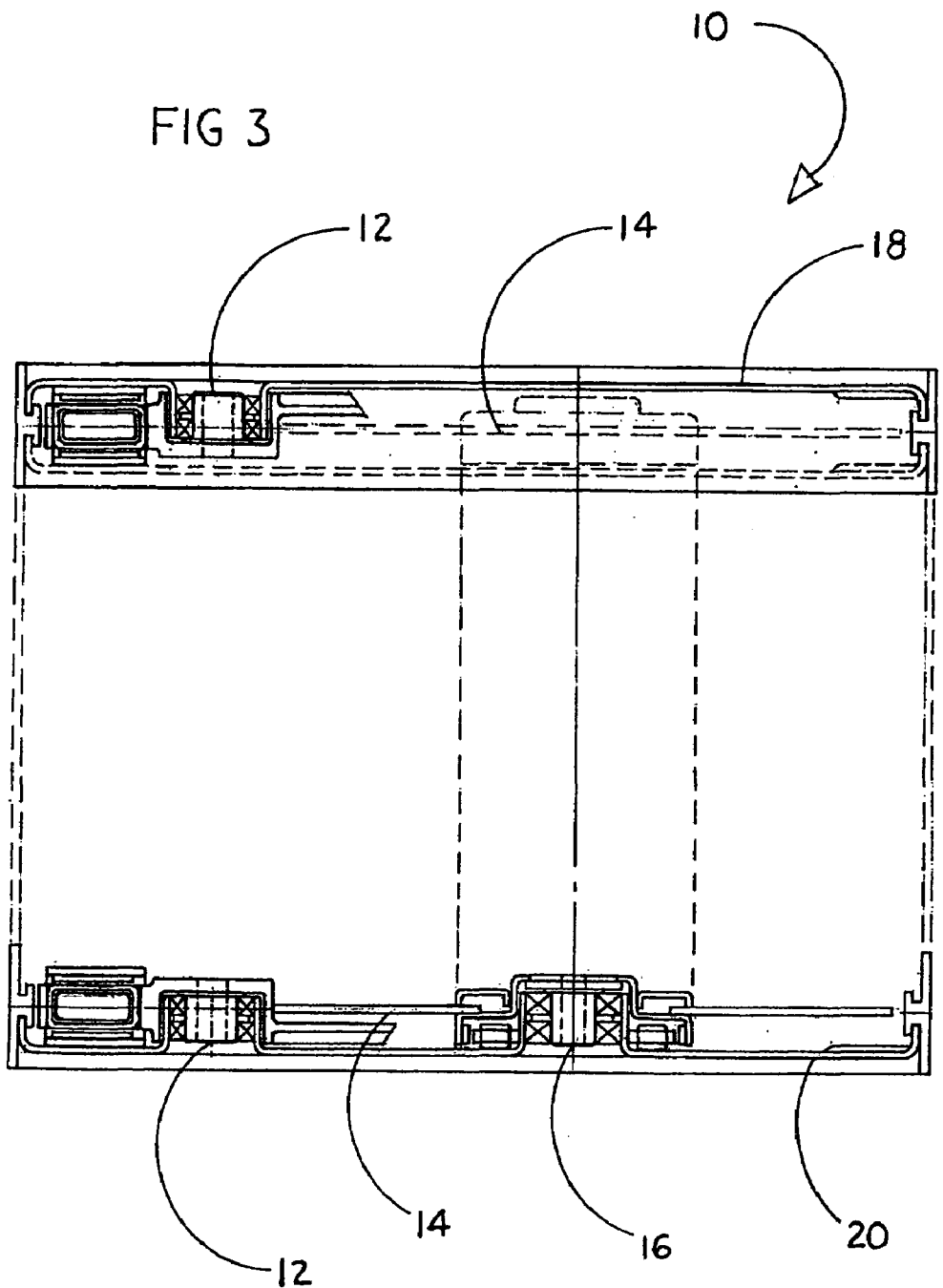
FIG. 3 is sectional side view illustrating the second plate of the data storage device, constructed in accordance with the present invention, having a single actuator assembly.
FIG. 4 is a sectional side view illustrating the first plate of the data storage device, constructed in accordance with the present invention, having a single actuator assembly.
Figure 5:
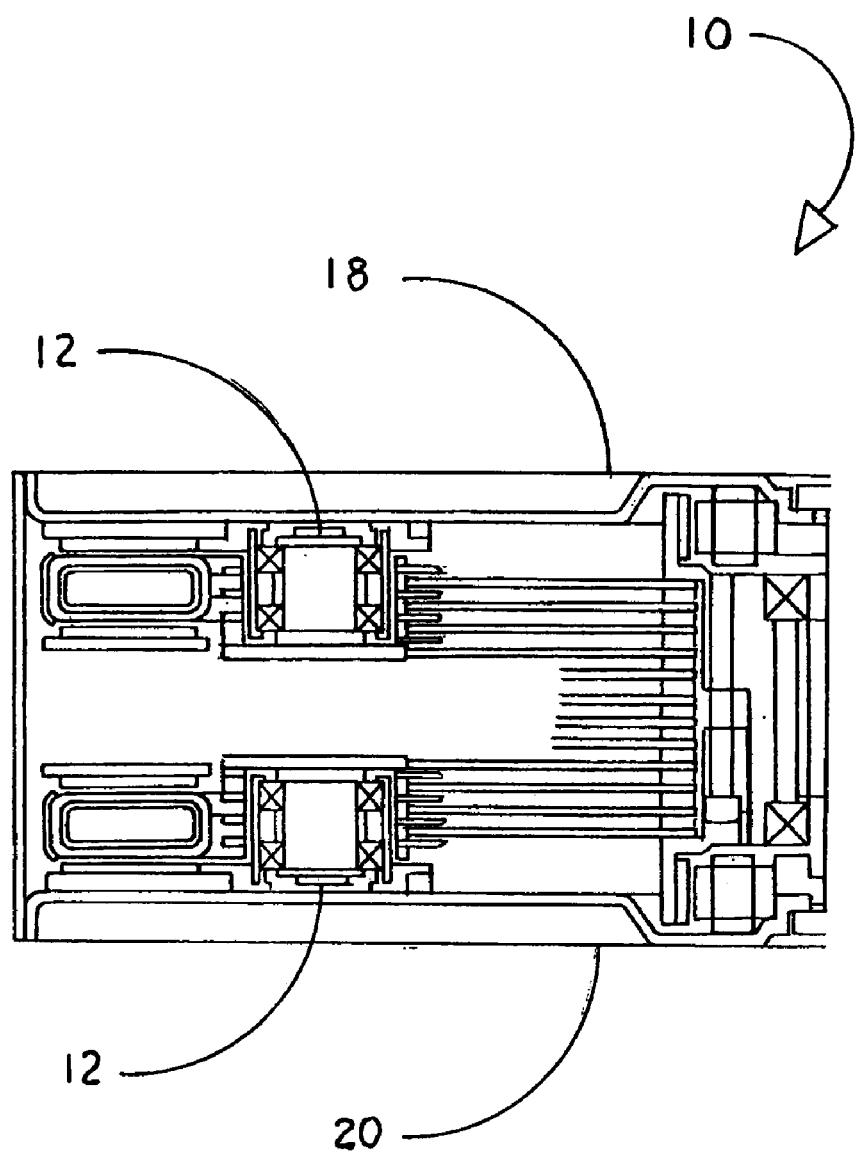
FIG. 5 is a top plan view illustrating the data storage device of FIGS. 3 and 4, constructed in accordance with the present invention.
Figure 6:
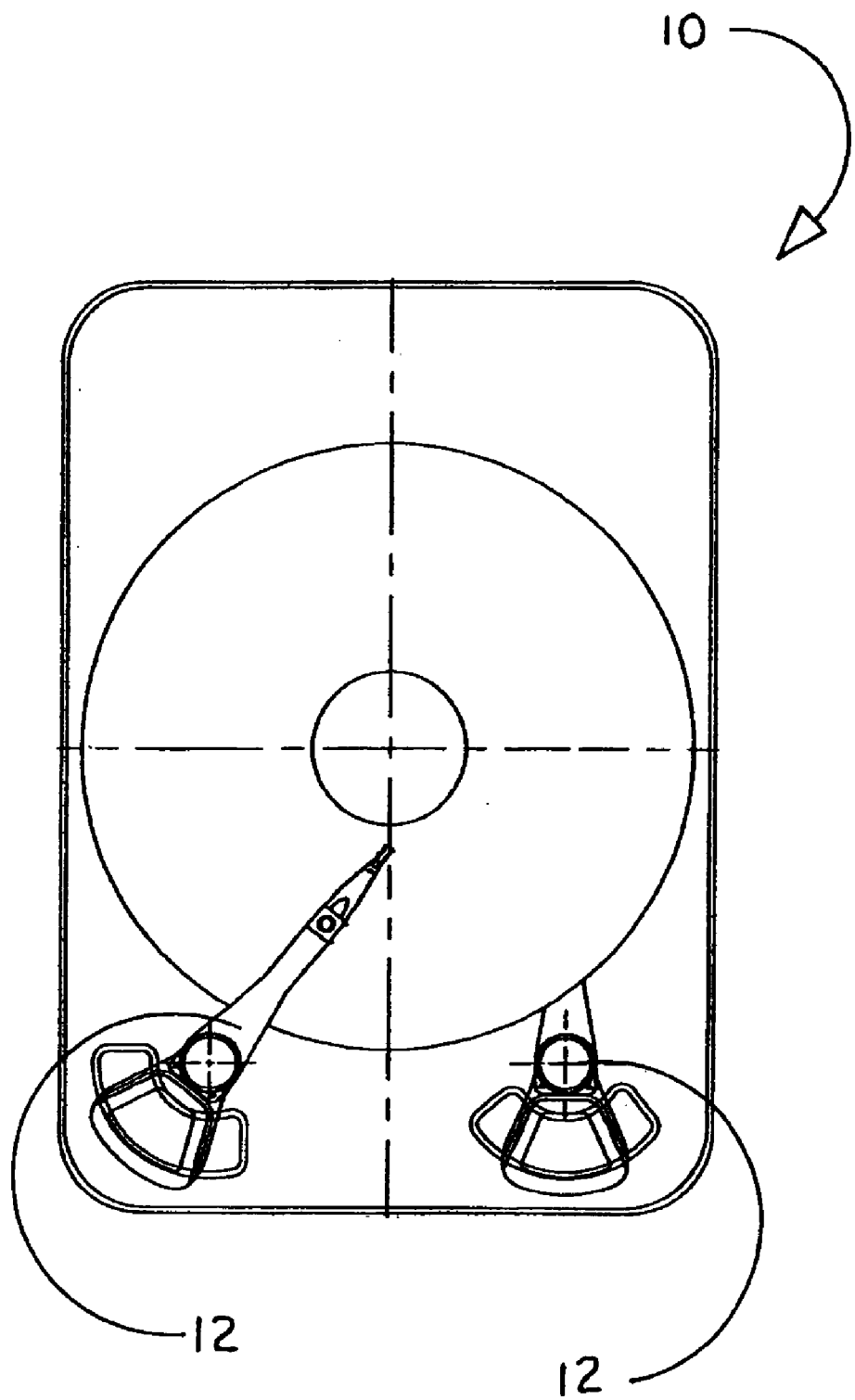
FIG. 6 is another top plan view illustrating the data storage device of FIGS. 3 and 4, constructed in accordance with the present invention.

As illustrated in FIGS. 1 and 2, in the single actuator assembly embodiment of the data storage device 10 of the present invention, as areal density increases and spindle assembly 16 speed increases to 7200 rpm and faster, the single arm/head actuator arm assembly 12 and single sided disk 14 will become the predominate disk drive supplied to the personal computer industry. The data storage device 10 has the drive spindle assembly 16 mounted on a first plate 20 and the single arm/head actuator arm assembly 12 mounted on a second plate 18. Typically, the first plate 20 is a bottom plate housing and the second plate 18 is the top plate, as described above. It is within the scope of the present application, however, to have the first plate 20 be designated as the top plate and the second plate 28 be designated as the bottom plate housing.

The second plate 18 and the first plate 20 of the data storage device 10 of the present invention are preferably fastened together with plastic dampening spacers 22 although fastening together the second plate 18 and the first plate 20 using other means is within the scope of the present invention. The dampening spacers 22 are preferably positioned at the corners of the second plate 18 and the first plate 20. Preferably, the dampening spacers 22 are constructed from a plastic material although constructing the dampening spacers 22 from another material which dampens resonance between the second plate 18 and the first plate 20 are within the scope of the present invention.

In the emerging set top box industry, a requirement exists to record and play video at visually the same time. This could require multiple actuator arm assemblies 12 in the onboard data storage device, i.e., the disk drive. As illustrated in FIGS. 3, 4, 5, and 6, in the multiple actuator assemblies' embodiment of the data storage device 10 of the present invention, this requirement is met. The data storage device 10 of the present invention has a single arm/head actuator arm assembly 12 mounted to the second plate 18 and another single arm/head actuator arm assembly 12 mounted to the first plate 20.

As with the embodiment described above, the second plate 18 and the first plate 20 are preferably fastened together with dampening spacers 22. The dampening spacers 22 are preferably positioned at the corners of the second plate 18 and the first plate 20. Preferably, the dampening spacers 22 are constructed from a plastic material although constructing the dampening spacers 22 from another material which dampens resonance between the second plate 18 and the first plate 20 are within the scope of the present invention.

Due to the plastic dampening spacers 22 between the second plate 18 and the first plate 20, the second plate 18 and the first plate 20 will be isolated from each other. This embodiment can also be used for single arm/dual head actuator arm assemblies 12 or multiple actuator arm assemblies 12.

It should be noted that the data storage device 10 of the present invention can include more than two actuator arm assemblies 12. The additional actuator arm assemblies 12 are mountable to either the second plate 18 or the first plate 20 or both.

In a preferred embodiment, the first plate 20 and the second plate 18 are constructed from a metal material including, but not limited to, steel, aluminum, copper, etc. It is within the scope of the present invention, however, to construct the first plate 20 and the second plate 18 from other suitable materials including, but not limited to, other metals, plastics, composites, etc.

As illustrated in FIGS. 7–13, the data storage device 10 of the present invention further includes a plastic overlay 30 secured to the outside surface of the metal second plate 18 and a plastic overlay 32 secured to the outside surface of the metal first plate 20. In this embodiment, the first plate 20 and the second plate 18 can be referred to as a metal liner 24. The plastic overlays 30, 32 are preferably secured to the second plate 18 and the first plate 20 by bonding, i.e., with an adhesive or other means.

While any plastic material for use with the plastic overlays 30, 32 are within the scope of the present invention, the plastic overlays 30, 32 are preferably constructed from a low durometer, thermal conductive plastic for adequate shock resistance. The metal first plate 20 and the metal second plate 18 are preferably extruded during manufacture thereby requiring no separate housing for either the spindle assembly 16 and the actuator assemblies 12.

Figure 7:
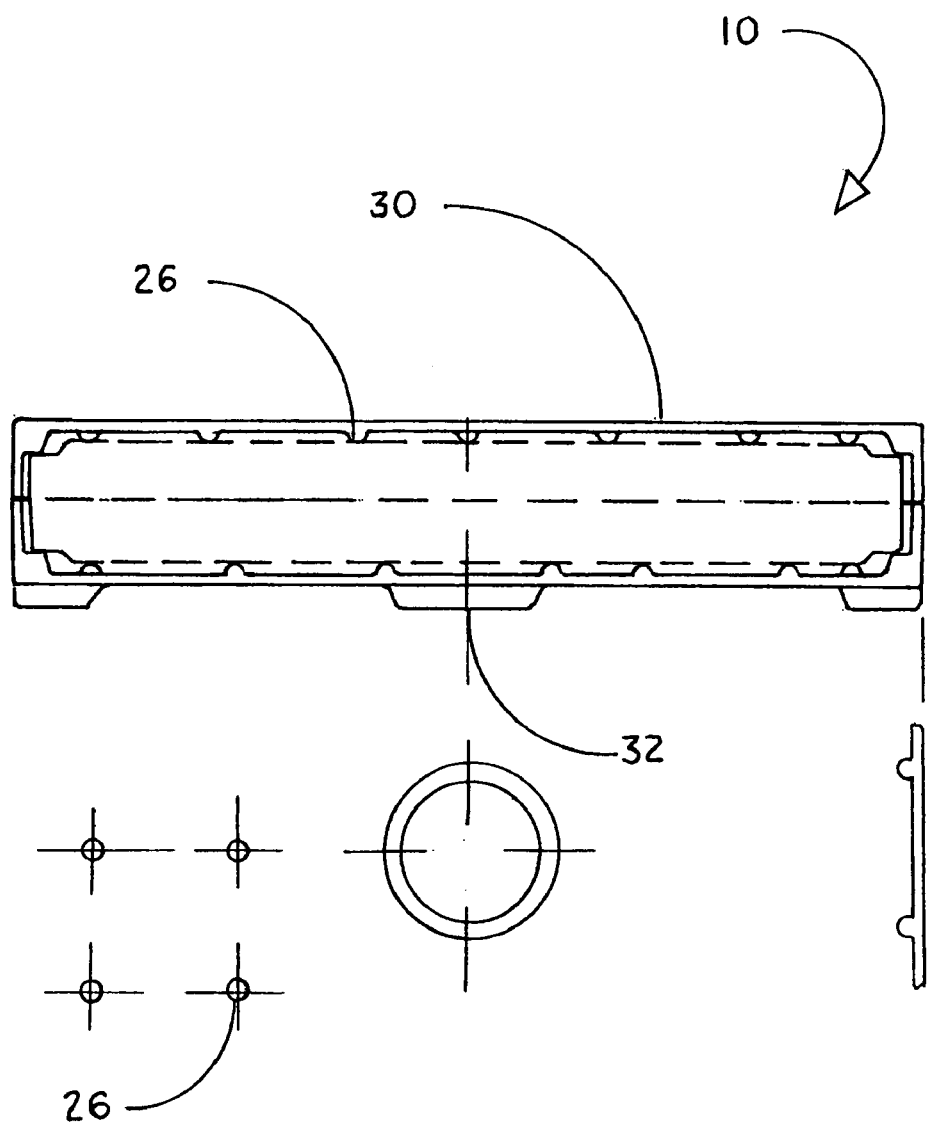
FIG. 7 is a sectional side view illustrating the data storage device having a shock absorbing base plate and top plate constructed from a plastic material.

As further illustrated in FIG. 7, the data storage device 10 of the present invention includes protrusions 26 formed on the plastic overlay 30 between the plastic overlay 30 of the second plate 18 and the plastic overlay 32 between the plastic overlay 32 and the first plate 20 to further resist and accommodate shock generated from an external source, i.e., dropping or otherwise moving the data storage device 10. Preferably, each protrusion 26 has an approximately three-sixteen (3/16") inch diameter. The number and spacing of the protrusions 26 can be varied depending on the required shock resistance of the data storage device 10. In a preferred embodiment, the protrusions 26 are formed in an evenly spaced manner about the surface of the plastic overlays 30, 32.

Figure 8:
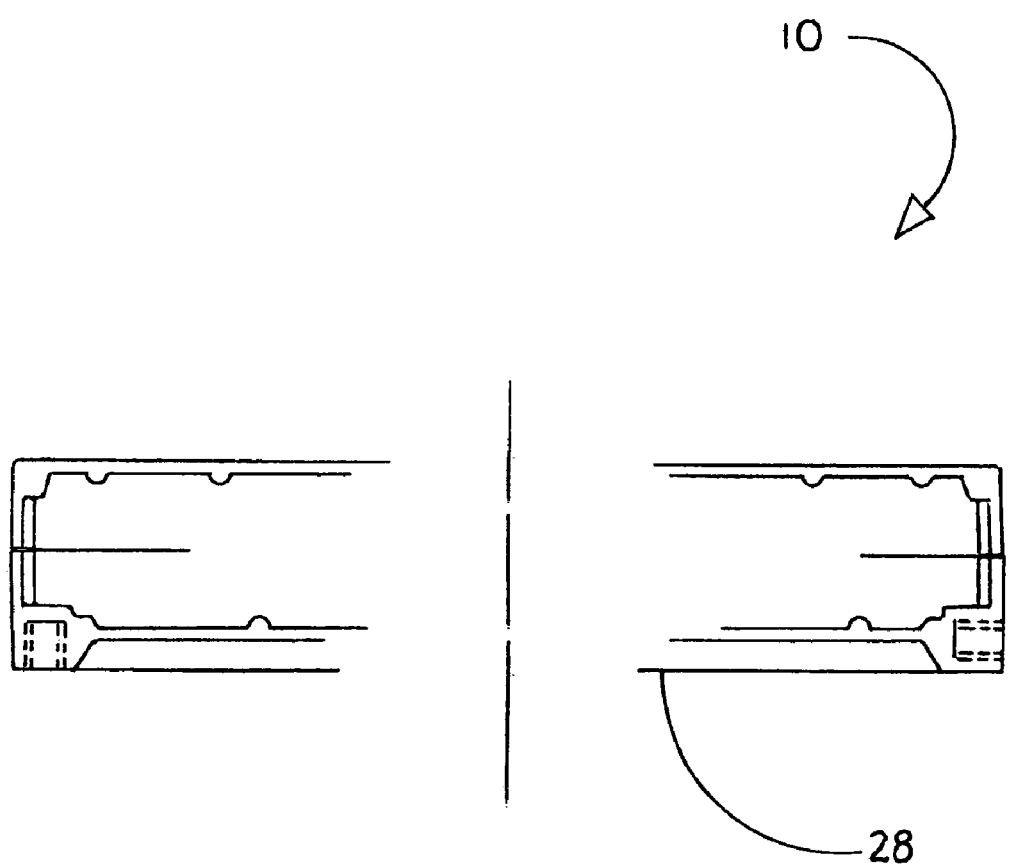
FIG. 8 is a sectional side view illustrating the data storage device having a side rail for internal mounting, constructed in accordance with the present invention.
Figure 9:
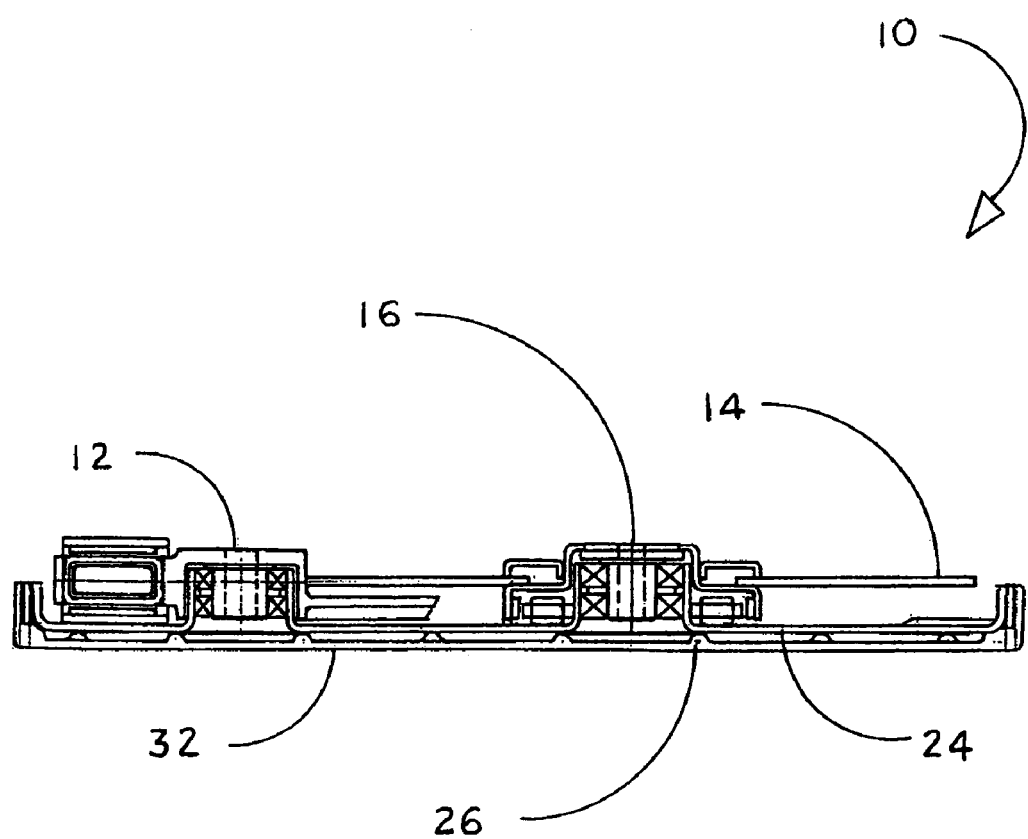
FIG. 9 is sectional side view illustrating the data storage device having a base plate housing constructed from a plastic material with a thin steel liner secured to the base plate housing.
Figure 10:
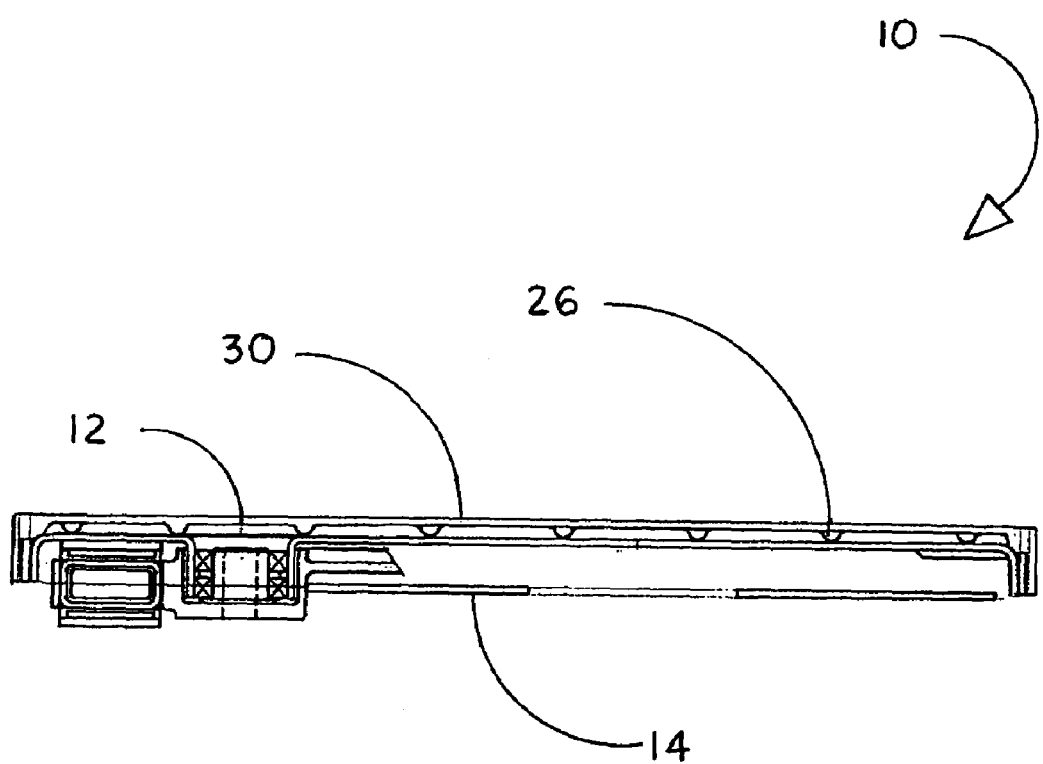
FIG. 10 is sectional side view illustrating the data storage device having a top plate constructed from a plastic material with a thin steel liner secured to the top plate.
Figure 13:
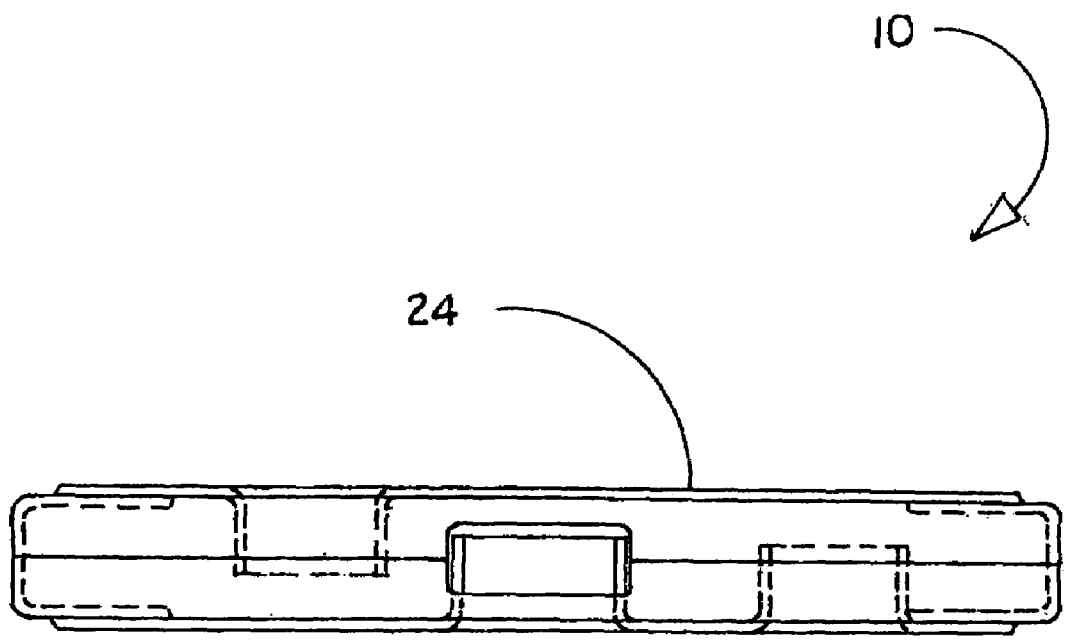
FIG. 13 is a sectional side view illustrating the thin steel liner secured to both the plastic top plate and base plate.

As further illustrated in FIG. 8, the data storage device 10 of the present invention includes at least one side rail 28 secured about the second plate 18 and the first plate 20. The side rail 28 allows the data storage device 10 to be mounted within a computer system (not shown).

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A data storage device having at least one disk rotated by a spindle motor and at least one actuator arm assembly rotatable in response to a voice coil motor about a pivot point for moving a magnetic head on an actuator arm for writing data onto the tracks of the disk and reading the data recorded on the tracks of the disk, the data storage device comprising:
    a first plate, the spindle motor being secured only to the first plate;
    a first actuator arm assembly secured only to the first plate;
    a second plate secured to the first plate; and
    a second actuator arm assembly secured only to the second plate.

2. The data storage device of claim 1, and further comprising:
    a third actuator arm assembly secured only to either the first plate or the second plate.

3. The data storage device of claim 2, and further comprising:
    a fourth actuator arm assembly secured only to either the first plate or the second plate.

4. The data storage device of claim 3 wherein each additional actuator arm assembly is secured only to either the first plate or the second plate housing.

5. The data storage device of claim 1 wherein the first plate and the second plate are fastened together with plastic dampening spacers.

6. The data storage device of claim 1 wherein the first plate is constructed from a metal material and the second plate is constructed from a metal material.

7. The data storage device of claim 1 wherein the first plate has an extrusion for housing the spindle assembly and the second plate has an extrusion for housing the actuator assembly.

8. A method for mounting at least one actuator arm assembly within a data storage device, the method comprising:
   providing a first plate;
   securing a spindle only to the first plate; and
   providing a first actuator arm assembly;
   securing the first actuator arm assembly only to the first plate;
   providing a second plate;
   providing a second actuator arm assembly;
   securing the second actuator arm assembly only to the second plate; and
   mounting the first plate to the second plate.

9. The method of claim 8, and further comprising:
   providing a third actuator arm assembly; and
   securing the third actuator arm assembly only to either the first plate or the second plate.

10. The method of claim 9, and further comprising:
    providing a fourth actuator arm assembly; and
    securing the fourth actuator arm assembly only to either the first plate or the second plate.

11. The method of claim 8, and further comprising:
    fastening the first plate and the second plate together with plastic dampening spacers.

12. The method of claim 8, and further comprising:
    constructing the first plate from a metal material; and
    constructing the second plate from a metal material.

13. The method of claim 12, and further comprising:
    securing a first plastic overlay to the first plate; and
    securing a second plastic overlay to the second plate.

14. The method of claim 13, and further comprising:
    forming a plurality of first protrusions on the first plastic overlay between the first plastic overlay and the first plate; and
    forming a plurality of second protrusions on the second plastic overlay between the second plastic overlay and the second plate.

15. The method of claim 8 and further comprising:
    forming a spindle assembly housing in the first plate; and
    forming an actuator assembly housing in the second plate.

16. A data storage device having at least one disk rotated by a spindle motor and at least one actuator arm assembly rotatable in response to a voice coil motor about a pivot point for moving a magnetic head on an actuator arm for writing data onto the tracks of the disk and reading the data recorded on the tracks of the disk, the data storage device comprising:
    a first plate, the spindle motor being secured to the first plate;
    a second plate secured to the first plate, the actuator arm assembly being secured to the second plate;
    a first plastic overlay bonded to an outside surface of the first plate; and
    a second plastic overlay bonded to an outside surface of the second plate.

17. The data storage device of claim 16 wherein each plastic overlay is constructed from a low durometer, thermal conductive plastic with shock resistance.

18. The data storage device of claim 16 and further comprising:
    a plurality of first protrusions extending from the first plastic overlay and the first plate;
    a plurality of second protrusions extending from the second plastic overlay and the second plate.

* * * * *